(12) United States Patent
Grzelecki et al.

(10) Patent No.: US 10,539,023 B2
(45) Date of Patent: Jan. 21, 2020

(54) FLOW CONTROL IN MODULATED AIR SYSTEMS

(71) Applicant: Rolls-Royce Corporation, Indianapolis, IN (US)

(72) Inventors: Michael Grzelecki, Westfield, IN (US); Michael Monzella, Indianapolis, IN (US); Renée M. Wiley, Avon, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 230 days.

(21) Appl. No.: 15/842,354

(22) Filed: Dec. 14, 2017

(65) Prior Publication Data

US 2019/0186267 A1 Jun. 20, 2019

(51) Int. Cl.
*F01D 5/08* (2006.01)
*F01D 17/10* (2006.01)

(52) U.S. Cl.
CPC .............. *F01D 5/08* (2013.01); *F01D 17/105* (2013.01); *F05D 2260/2212* (2013.01)

(58) Field of Classification Search
CPC .......... F01D 5/08; F01D 17/105; F01D 25/12; F05D 2260/2212; F05D 2270/306; F02C 7/18; F02C 9/18
See application file for complete search history.

(56) References Cited

U.S. PATENT DOCUMENTS

| | | | | |
|---|---|---|---|---|
| 6,615,574 | B1 * | 9/2003 | Marks | F02C 7/18 60/772 |
| 7,712,317 | B2 * | 5/2010 | Scanlon | F01D 25/12 137/808 |
| 8,225,813 | B2 * | 7/2012 | Evanno | F02C 6/08 137/468 |
| 2007/0277888 | A1 * | 12/2007 | Scanlon | F01D 25/12 137/624.27 |
| 2010/0043899 | A1 * | 2/2010 | Evanno | F02C 6/08 137/637 |
| 2014/0060683 | A1 | 3/2014 | Bathina | |
| 2014/0208768 | A1 * | 7/2014 | Bacic | F01D 5/082 60/782 |
| 2018/0010520 | A1 * | 1/2018 | Iwasaki | F01D 25/12 |

FOREIGN PATENT DOCUMENTS

DE    11 2016 000 551 T5    10/2017

OTHER PUBLICATIONS

European Patent Office, Extended European Search Report for corresponding EP Application No. 18206132.5 dated Apr. 29, 2019, 8pgs.

* cited by examiner

*Primary Examiner* — Eldon T Brockman
(74) *Attorney, Agent, or Firm* — Duane Morris LLP; Patrick Craig Muldoon

(57) ABSTRACT

Various embodiments of the present disclosure provide a turbine engine cooling system configured to provide cooling air to a particular region of the engine to cool that region of the engine. The cooling system is configured to modulate the flow of cooling air to reduce the amount of cooling air flowing to that region of the engine during periods in which less cooling is needed. The cooling system includes a flow limiter configured to choke the mass flow rate of the cooling air provided to the region during modulation to avoid providing more cooling air than is needed to adequately cool that region of the engine.

20 Claims, 5 Drawing Sheets

FLOW CONTROL IN MODULATED AIR SYSTEMS

CROSS REFERENCES

This application is related to and concurrently filed with co-pending U.S. patent application Ser. No. 15/842,350, filed Dec. 14, 2017, entitled "Modulated Cooling Air Control System and Method for a Turbine Engine", with inventors Michael Grzelecki, Michael Monzella and Renee M. Wiley, and U.S. patent application Ser. No. 15/842,342, filed Dec. 14, 2017, entitled "Turbine Engine Cooling with Substantially Uniform Cooling Air Flow Distribution", with named inventors Matthew M. Miller and Renee M. Wiley. The entirety of each of these applications is incorporated herein by reference.

FIELD

The present disclosure relates to turbine engine cooling systems, and more specifically to turbine engine cooling systems including flow limiters and configured to modulate cooling air flow.

BACKGROUND

Certain known gas turbine engines include cooling systems configured to direct air from the compressor stage of the engine to the turbine stage of the engine to cool the components in the turbine stage, such as the turbine discs and blades. Since the cooling air is typically bled from the compressor, the work required to compress the cooling air is lost and thus the efficiency of the engine decreases as more cooling air is diverted from the compressor stage to the turbine stage. There is a continuing need to minimize the amount of air diverted from the compressor stage to the turbine stage for cooling.

FIG. 1 is a simplified partial cutaway view of an example gas turbofan engine 10 (sometimes referred to as the "engine" for brevity) having a rotational axis X-X. The engine 10 includes an air intake 11, a propulsive fan 12, an intermediate-pressure compressor 13, a high-pressure compressor 14, a combustor 15, a high-pressure turbine 16, an intermediate-pressure turbine 17, a low-pressure turbine 18, and an exhaust nozzle 19. The high-pressure compressor 14 and the high-pressure turbine 16 are connected via a shaft 20 and rotate together about the rotational axis X-X. The intermediate-pressure compressor 13 and the intermediate-pressure turbine 17 are connected via a shaft 21 and rotate together about the rotational axis X-X. The fan 12 and the low-pressure turbine 18 are connected via a shaft 22 and rotate together about the rotational axis X-X. A fan nacelle 24 generally surrounds the fan 12 and defines the air intake 11 and a bypass duct 23. Fan outlet guide vanes 25 secure the fan nacelle 24 to the core engine casing.

In operation, the fan 12 compresses air entering the air intake 11 to produce a bypass air flow that passes through the bypass duct 23 to provide propulsive thrust and a core air flow into the intermediate-pressure compressor 13. The intermediate-pressure compressor 13 compresses the air before delivering the air to the high-pressure compressor 14. The high-pressure compressor 14 further compresses the air and exhausts the compressed air into the combustor 15. The combustor 15 mixes the compressed air with fuel and ignites the fuel/compressed air mixture. The resultant hot combustion products then expand through—and thereby drive—the high-, intermediate-, and low-pressure turbines 16, 17, and 18 before being exhausted through the exhaust nozzle 19 to provide additional propulsive thrust. The high-, intermediate-, and low-pressure turbines 16, 17, and 18 respectively drive the high-pressure compressor 14, the intermediate-pressure compressor 13, and the fan 12 via the respective shafts 20, 21, and 22.

A conventional cooling system is illustrated in FIGS. 2 and 3. The turbine engine cooling system (sometimes referred to as the "cooling system" for brevity) configured to provide cooling air to regions of the engine 10 to cool those regions. The cooling system is configured to modulate the flow of cooling air to reduce the amount of cooling air flowing to certain regions of the engine 10 during periods in which less cooling is needed.

As shown in FIGS. 2 and 3 a cooling system 100 is fluidly connectable to a cooling air source 92, a control air source 94, and a cooled region 96. The cooled region 96 is any suitable region of the engine 10 to-be-cooled by cooling air from the cooling air source 92. The cooling air source 92 is any suitable source of cooling air, and the control air source 94 is any suitable source of control air. Typically, both the cooling air source and the control air source is one of the compressor stages of the engine 10. The control air source pressure in the example shown in FIGS. 2 and 3 is higher than the cooling air source pressure.

In FIG. 2, the cooled region 96 includes the turbine section cavity in which the turbines stages 16, 17, and 18 may be positioned. The cooling air source 92 may be the intermediate-pressure compressor stage of the engine 10; and the control air source 94 may be the high-pressure compressor stage of the engine 10.

The cooling system 100 includes cooling air supply feeds for delivering the cooling air to the cooled region. Typically, the air supply feeds may be defined by any combination of lines, piping, tubing, ducting or passages defined within the engine casing etc. As illustrated in FIG. 2, the cooling system includes a first supply feed 100a and a second supply feed 100b. The first supply feed 100a as shown is unmodulated and includes segment 102a fed by cooling air source outlet 101.

The second supply feed 100b is configured to be modulated. The second supply feed 100b includes a first segment 102b also feed by outlet 101, a flow control device 110b followed by a second segment 104b. line segment 102a and 102b are in fluid communication via outlet 101, common compressor tap or distribution manifold. FIG. 2 also illustrates the typical components for a modulated supply line including a control air source 94, a control air delivery line 108b and the flow control device 110b.

The flow control device 110b is a suitable device configured to control whether, and how much cooling air flows from the cooling air source 92 to cooled region 96 via the second supply feed 100b. The flow control device 110b includes a controller 190, a valve 112b and a vortex amplifier 114b. The vortex amplifier 114b has a cooling air inlet, a control air inlet, and a cooling air outlet. The valve 112b has a control air inlet and a control air outlet and is operated by the controller to regulate the amount of control air fed to the vortex amplifier 114b and thus controls the flow of cooling air to the cooled region via the second supply feed 102b.

The control air delivery line 108b is in fluid communication with the control air source 94 and the vortex amplifier 114b when the valve 112b is opened. The control air source 94 and vortex amplifier 114b are communicatively isolated from one another when the valve 112b is closed.

As shown in FIG. 2, when the second supply feed is not modulated, the flow to the cooled region through the first and second supply feeds are at a design state and represented as arrows 200a and 200b. However, as shown in FIG. 3, when the second supply feed is modulated by opening the valve 112b and restricting cooling air from passing through the vortex amplifier, the flow of cooling air in the non-modulated first supply feed increases as represented by arrow 201a in FIG. 3. This increase in flow through the first supply feed 102a diminishes some of the performance gained through modulation of the second supply feed 102b. Table 1 below illustrates the effects on the first and second supply feeds when the second supply feed is modulated.

TABLE 1

|  | Second supply feed NOT MODULATED Cooling Air Mass Flow Rate (lbs/sec) | Second supply feed MODULATED Cooling Air Mass Flow Rate (lbs/sec) |
| --- | --- | --- |
| First supply feed (102a) | 0.489 | 0.789 |
| Second supply feed (102b) | 0.384 | 0.016 |
| Combined Feed (102a + 102b) | 0.873 | 0.805 |

As shown above, the increase in mass flow through the first supply feed significantly offsets the reduction in mass flow in the second supply feed via modulation. In this example a 95 percent reduction in mass flow through the second supply feed only reduces the total mass flow by 10 percent. Thus the potential gain in efficiency via modulation is substantially reduced.

SUMMARY

Various embodiments of the present disclosure provide a turbine engine cooling system configured to provide cooling air to a multiple regions of the engine to cool those regions of the engine. The cooling system is configured to modulate the flow of cooling air to reduce the amount of cooling air flowing to certain regions of the engine during periods in which less cooling is needed. The cooling system includes a flow limiter configured to choke the mass flow rate of the cooling air provided to other regions during modulation to avoid providing more cooling air than is needed to adequately cool the other regions of the engine.

Embodiments of the disclosed subject matter include a turbine engine cooling system, including a first supply feed including a first flow limiter, the first supply feed fluidly connected to a cooling air source and a turbine section cavity to define a first cooling air path therebetween, and a second supply feed including a flow control device, the second supply feed fluidly connected to the cooling air source and the turbine section cavity to define an interruptible second cooling air path therebetween; the first and second supply feeds being in fluidic communication upstream of the flow control device. The cooling system further including a controller operably connected to the flow control device to control the flow control device to restrict cooling air flow through the second cooling air path; wherein the first flow limiter is configured to enforce a limit on a mass flow rate of cooling air exiting the first flow limiter when the second cooling air path is restricted by the flow control device.

Other embodiments of the disclosed subject matter include a turbine engine including a cooling air source; a turbine section defining a turbine section cavity; and a cooling system. The cooling system including a first supply feed including a first flow limiter and defining a first cooling air path between the cooling air source and the turbine section cavity; a second supply feed including a flow control device and defining a second cooling air path between the cooling air source and the turbine section cavity; and a controller configured to, responsive to a cooling air modulation condition being satisfied, control the flow control device to restrict the cooling air from flowing from the cooling air source through the second supply feed to the turbine section cavity, thereby increasing the amount of cooling air flowing from the cooling air source available to the first cooling air path, wherein the first flow limiter configured to cause a choked mass flow rate condition to be met in response to the increased amount of cooling air available.

Another embodiment of the disclosed subject matter includes a method of cooling a turbine section cavity of a turbine engine. The method including flowing cooling air from a cooling air source through a first cooling air path defined by a first supply feed including a first flow limiter to the turbine section cavity; flowing cooling air from the cooling air source through a second cooling air path defined by a second supply feed including a flow control device to the turbine section cavity; and responsive to a cooling air modulation condition being satisfied, restricting the cooling air from flowing from the cooling air source through the second cooling air path to the turbine section cavity, thereby increasing the amount of cooling air flowing from the cooling air source into the first cooling air path and causing a choked mass flow rate condition to be met at the first flow limiter to limit the mass flow rate of the cooling air exiting the first flow limiter.

DETAILED DESCRIPTION

Figure 1:
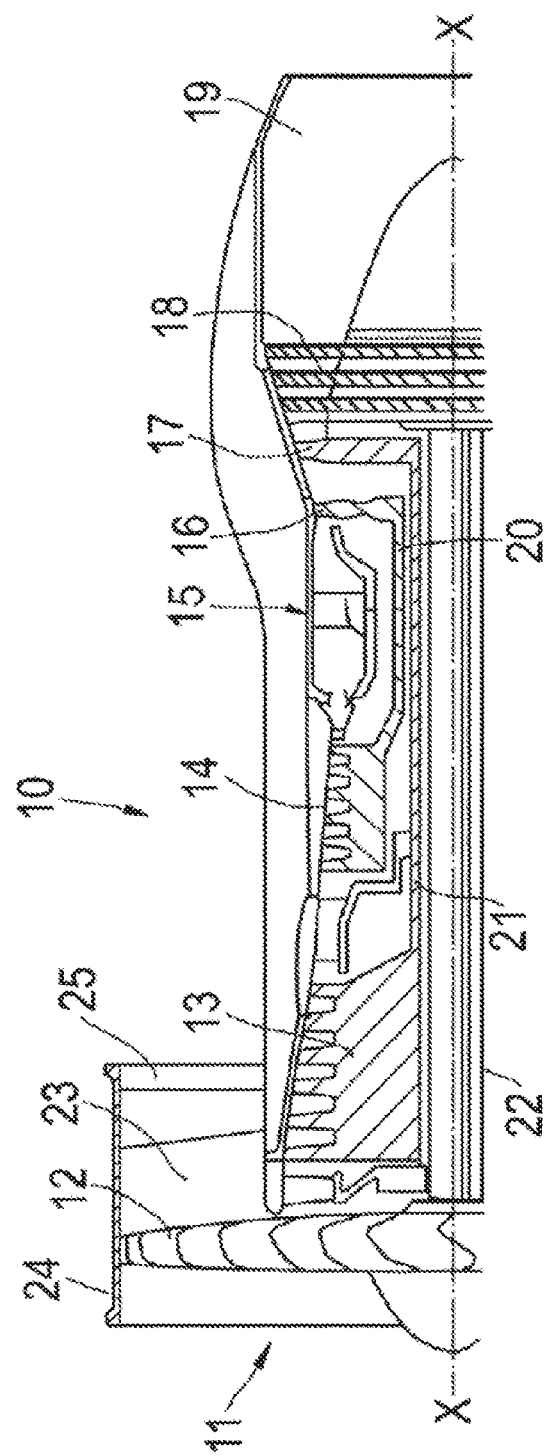
FIG. 1 is a partial cutaway view of one example embodiment of a turbofan gas turbine engine of the present disclosure.
Figure 2:
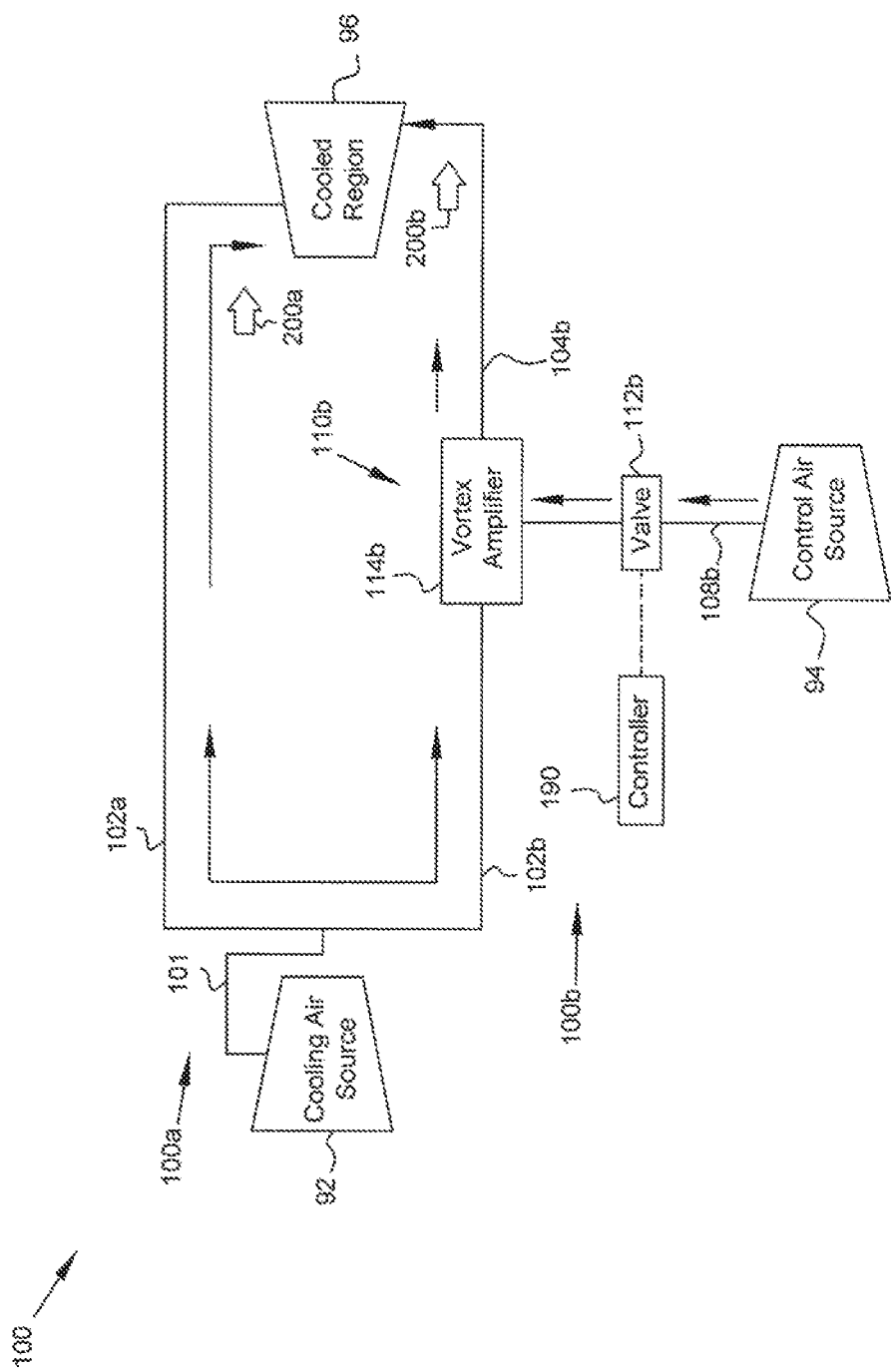
FIG. 2 is a block diagram of a prior art cooling system operating without modulation.

While the features, methods, devices, and systems described herein may be embodied in various forms, the drawings show and the detailed descriptions describe some exemplary and non-limiting embodiments. Not all of the components shown and described in the drawings and the detailed descriptions may be required, and some implementations may include additional, different, or fewer components from those expressly shown and described. Variations in the arrangement and type of the components; the shapes, sizes, and materials of the components; and the manners of attachment and connections of the components may be made without departing from the spirit or scope of the claims as set forth herein. This specification is intended to be taken as a whole and interpreted in accordance with the principles of the invention as taught herein and understood by one of ordinary skill in the art.

As used herein, "downstream" means in the direction of air flow, and "upstream" means opposite the direction of airflow.

Various embodiments of the present disclosure provide a turbine engine cooling system (sometimes referred to as the "cooling system" for brevity) configured to provide cooling air to regions of the engine 10 to cool those region of the engine 10. The cooling system is configured to modulate the flow of cooling air to reduce the amount of cooling air flowing to certain regions of the engine 10 during periods in which less cooling is needed. The cooling system includes a flow limiter configured to choke the mass flow rate of the cooling air provided to other regions during modulation to avoid providing more cooling air than is needed to adequately cool the other regions of the engine 10.

Figure 4:
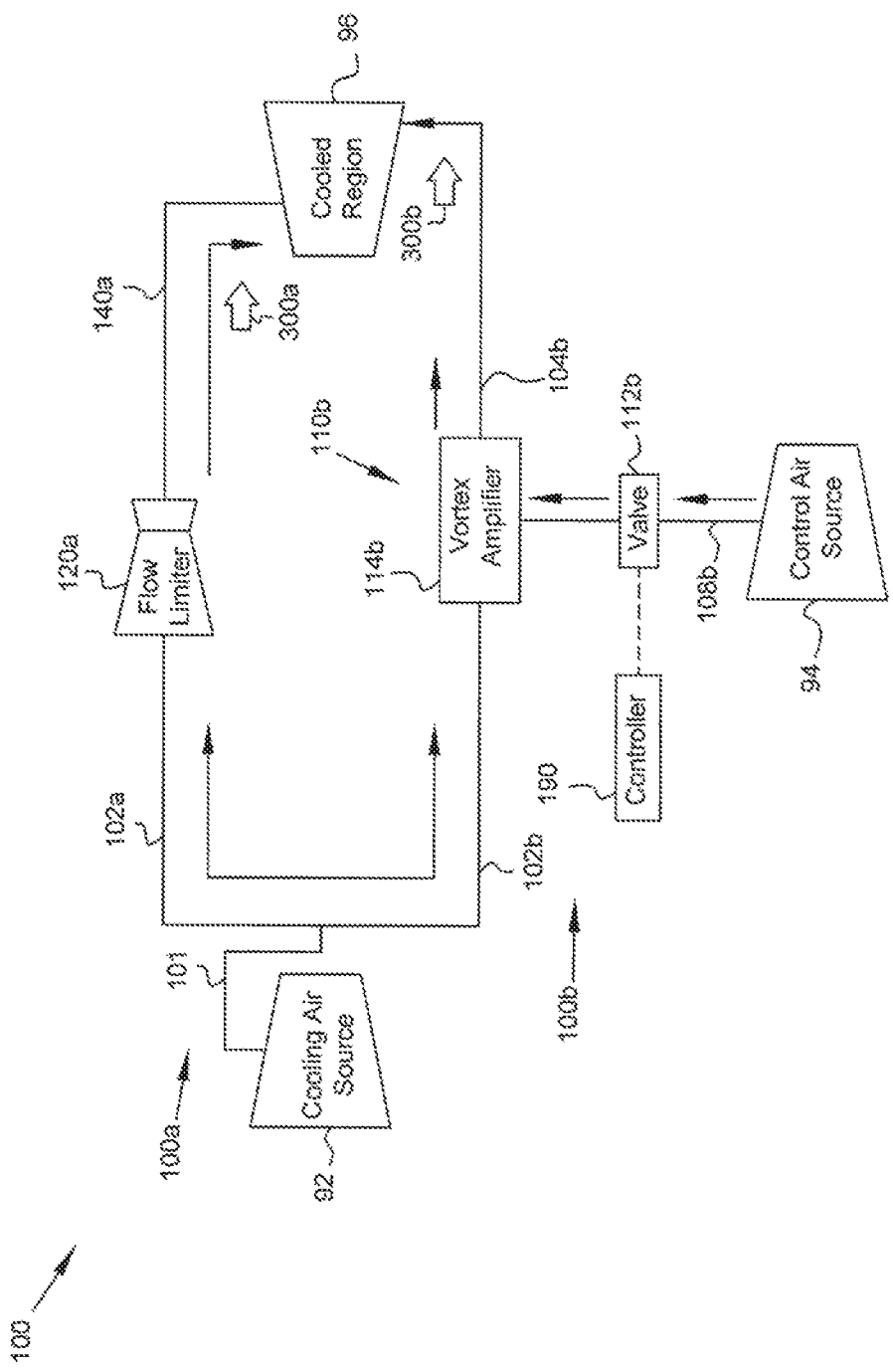
FIG. 4 is a block diagram of one example embodiment of a turbine engine cooling system of the present disclosure in a non-modulated operating mode.
Figure 5:
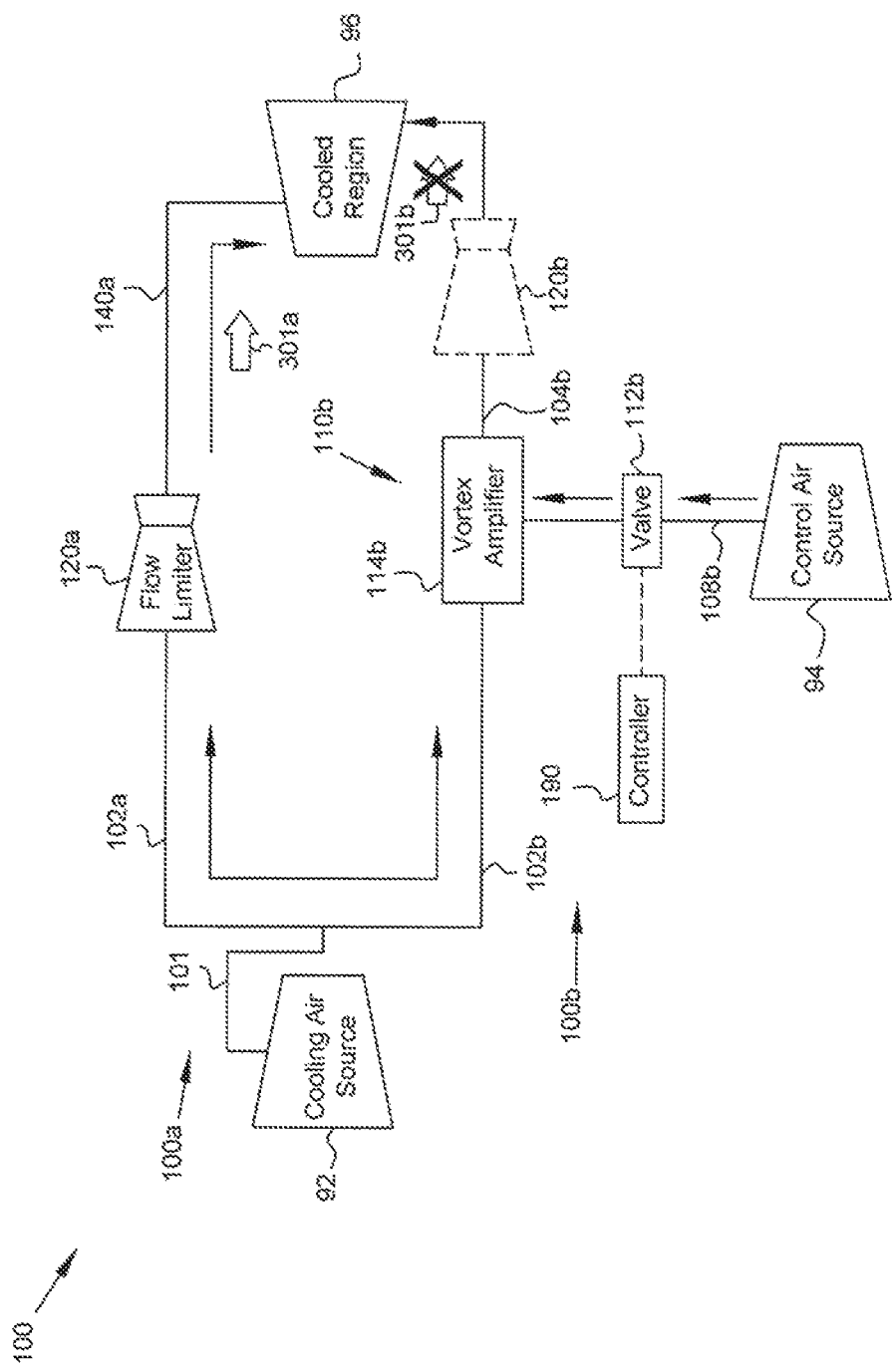
FIG. 5 is a block diagram of the turbine engine cooling system of FIG. 2 in a modulated operating mode.

FIGS. 4 and 5 show one example embodiment of a cooling system 100 fluidly connectable to a cooling air source 92, a control air source 94, and a cooled region 96. As noted previously, the cooled region 96 is any suitable region of the engine 10 to-be-cooled by cooling air from the cooling air source 92. The cooling air source 92 is any suitable source of cooling air, and the control air source 94 is any suitable source of control air. Both the cooling air source and the control air source is shown as one of the compressor stages of the engine 10. The control air source pressure is higher than the cooling air source pressure.

In this example embodiment: (1) the cooled region 96 includes the turbine section cavity in which any of the turbines stages 16, 17, and 18 may be positioned; (2) the cooling air source 92 is the intermediate-pressure compressor stage of the engine 10; and (3) the control air source 94 is the high-pressure compressor stage of the engine 10. These are merely examples, and the cooling air source may be any other suitable air source, the control air source may be any other suitable air source, and the cooled region may be any other suitable region of the engine in other embodiments.

The cooling system 100 includes a first supply feed 100a, a second supply feed 100b, and a controller 190. The first supply feed 100a includes a first cooling air tube 102a, a first flow limiter 120a, and a second cooling air tube 104a. The first supply feed 100a may include any suitable quantity of cooling air tubes.

The first flow limiter 120a includes any suitable device configured to limit the flow through the limiter, suitable devices may (1) choke the velocity of the cooling air exiting the cooling air outlet of the first flow limiter 120a at a choked velocity, which is Mach 1 in this example embodiment; and thus limit the mass flow rate of the cooling air exiting the cooling air outlet of the first flow limiter 120a to a mass flow rate when a choked flow condition is met. In this example embodiment, the choked flow condition is met when the velocity of the air exiting the cooling air outlet of the first flow limiter 120a is Mach 1.

For a given compressor power setting, the cooling air pressure and temperature are generally constant. This means that, for a given compressor power setting, the choked mass flow rate condition is met when the velocity of the air exiting the cooling air outlet of the first flow limiter 120a is Mach 1 and the choked mass flow rate is a function of the temperature and pressure of the cooling air, as well as the area of the Venturi. This is merely one example embodiment, and the first flow limiter and other components of the first supply feed may be configured to achieve any suitable choked mass flow rate at any suitable cooling air pressure and cooling air temperature.

In this example embodiment, the first flow limiter 120a includes a Venturi nozzle having a convergent section (including a cooling air inlet) and a divergent section (including a cooling air outlet) separated by a throat as is known in the art. These components are sized, shaped, and oriented to achieve the desired choked mass flow rate at a given cooling air source pressure and temperature. In other embodiments, the first flow limiter includes an orifice plate. The flow limiter 120a may also include active limiters to limit cooling air flow below an upper limit, such as an actively controlled vortex amplifier or mechanical restrictor.

One end of the first cooling air tube 102a is in fluid communication with the cooling air source 92, and the other end of the first cooling air tube 102a is in fluid communication with the cooling air inlet of the first flow limiter 120a. One end of the second cooling air tube 104a is in fluid communication with the cooling air outlet of the first flow limiter 120a, and the other end of the second cooling air tube 104a is in fluid communication with the cooled region 96. The first cooling air tube 102a, the first flow limiter 120a, and the second cooling air tube 104a define a first cooling air path between the cooling air source 92 and the cooled region 96.

The second supply feed 100b includes a first cooling air tube 102b, a flow control device 110b, a second cooling air tube 104b, and optionally a second flow limiter 120b, a third cooling air tube 106b, a first control air tube 108b, and a second control air tube 109b. The second supply feed 100b may include any suitable quantity of cooling air and control air tubes.

The flow control device 110b is a suitable device configured to control whether and how much cooling air can flow from the cooling air source 92 to the flow limiter 120b. In this example embodiment, the flow control device 110b includes a valve 112b and a vortex amplifier 114b. The vortex amplifier 114b has a cooling air inlet, a control air inlet, and a cooling air outlet. The valve 112b has a control air inlet and a control air outlet. The flow control device 110b is illustrated as a vortex amplifier, however other types of control devices are equally envisioned and the present subject matter provides advantages independent of the type of flow control devices used to modulate the cooling air supply feed.

The optional second flow limiter 120b may be identical to the first flow limiter 120a (though the optional second flow limiter may be different from the first flow limiter in other embodiments or not be included in the cooling system in further embodiments).

One end of the first cooling air tube 102b is in fluid communication with the cooling air source 92, and the other end of the first cooling air tube 102b is in fluid communication with the cooling air inlet of the vortex amplifier 114b. One end of the second cooling air tube 104b is in fluid communication with the cooling air outlet of the vortex amplifier 114b, and the other end of the second cooling air tube 104b is in fluid communication with the cooling air inlet of the second flow limiter 120b. One end of the third cooling air tube 106b is in fluid communication with the cooling air outlet of the second flow limiter 120b, and the other end of the third cooling air tube 106b is in fluid communication with the cooled region 96. The first cooling air tube 102b, the vortex amplifier 114b, the second cooling air tube 104b, the second flow limiter 120b, and the third cooling air tube 106b define a second cooling air path between the cooling air source 92 and the cooled region 96.

One end of the first control air tube 108b is in fluid communication with the control air source 94, and the other end of the first control air tube 108b is in fluid communication with the control air inlet of the valve 112b. One end of the second control air tube 109b is in fluid communication with the control air outlet of the valve 112b, and the other end of the second control air tube 109b is in fluid communication with the control air inlet of the vortex amplifier 114b. The first control air tube 108b, the valve 112b, and the second control air tube 109b define a control air path between the control air source 94 and the vortex amplifier 114b. The controller 190 includes a central processing unit (CPU) (not shown) communicatively connected to a memory (not shown). In certain embodiments, the engine control system of the aircraft functions as the controller 190, while in other embodiments the controller 190 is a dedicated controller of the cooling system 100. The CPU is configured to execute program code or instructions stored on the memory to control operation of the cooling system 100. The CPU may be a microprocessor; a content-addressable memory; a digital-signal processor; an application-specific integrated circuit; a field-programmable gate array; any suitable programmable logic device, discrete gate, or transistor logic; discrete hardware components; or any combination of these. The CPU may also be implemented as a combination of these devices, such as a combination of a digital signal processor and a microprocessor, a plurality of microprocessors, or one or more microprocessors in conjunction with a digital signal processor core.

The memory is configured to store, maintain, and provide data as needed to support the functionality of the cooling system 100. For instance, in various embodiments, the memory stores program code or instructions executable by the CPU to control operation of the cooling system 100. The memory includes any suitable data storage device or devices, such as volatile memory (e.g., random-access memory, dynamic random-access memory, or static random-access memory); non-volatile memory (e.g., read-only memory, mask read-only memory, programmable read-only memory, erasable programmable read-only memory, electrically erasable programmable read-only memory); and/or non-volatile random-access memory (e.g., flash memory, solid-state storage).

The controller 190 is operatively connected to the flow control device 110b to control the flow control device 110b to control the amount of cooling air that can flow through the second cooling air path. More specifically, the controller 190 is operatively connected to the valve 112b to control the valve 112b to move between an open configuration and a closed configuration. When the valve 112b is in the closed configuration, the valve 112b prevents control air from flowing from the control air source 96 to the vortex amplifier 114b, which enables cooling air to flow from the cooling air source 92 through the vortex amplifier 114b and to the cooled region 96. On the other hand, when the valve 112b is in the open configuration, the valve 112a enables control air to flow from the control air source 96 to the vortex amplifier 114b, which significantly restricts or completely blocks cooling air from flowing from the cooling air source 92 through the vortex amplifier 114b to the cooled region 96.

FIG. 4 shows the cooling system 100 when the valve 112b is in the closed configuration and preventing control air from flowing from the control air source 96 to the vortex amplifier 114b. This is referred to as the non-modulated operating mode. In the non-modulated operating mode, cooling air flows at a first mass flow rate from the cooling air source 92 through the first cooling air path through the first supply feed 100a and into the cooled region 96. Cooling air also flows at a second mass flow rate from the cooling air source 92 through the second cooling air path through the second supply feed 100b and into the cooled region 96. In this example embodiment, the first mass flow rate is 0.489 pounds per second and the second mass flow rate is 0.384 pounds per second, meaning a total mass flow rate of cooling air into the cooled region is 0.873 pounds per second in the non-modulated operating mode. These may be any other suitable values in other embodiments, and may be the same or different. Since the velocity of the cooling air traveling through the first and second flow limiters 120a and 120b does not reach the choked velocity in the non-modulated operating mode, the first and second flow limiters 120a and 120b do not choke the velocity or the mass flow rate of the cooling air.

FIG. 5 shows the cooling system 100 after the controller 190 has controlled the valve 112b to move from the closed configuration to the open configuration to enable control air to flow from the control air source 96 to the vortex amplifier 114b. This is referred to as the modulated operating mode. The control air that flows from the control air source 94 into the control air inlet of the vortex amplifier 114b has a higher pressure than the cooling air flowing from the cooling air source 92 into the cooling air inlet of the vortex amplifier 114b. As a result, the flow of air through the vortex amplifier 114b forms a vortex that significantly reduces the flow of cooling air from the vortex amplifier 114b to the flow limiter 120b. This significantly reduces the flow of cooling air from the cooling air source 92 through the second cooling air path through the second supply feed 100b and into the cooled region 96 to 0.021 pounds per second.

This significant reduction of cooling air flow through the second cooling air path causes the amount of cooling air that flows from the cooling air source 92 into the first supply feed 100a to increase such that the velocity of the cooling air exiting the cooling air outlet of the flow limiter 120a reaches the choked velocity. Since the cooling air source pressure and are constant (in this example embodiment, for a given compressor power output setting), the choked mass flow rate condition is met and the first flow limiter 120a chokes the mass flow rate of the cooling air exiting the cooling air outlet of the first flow limiter 120a at the choked mass flow rate of 0.627 pounds per second. The total mass flow rate of cooling air into the cooled region is therefore 0.648 pounds per second in the modulated operating mode. The total mass flow rate of cooling air into the cooled region 96 in the modulated operating mode (0.648 lbs/sec) is therefore: (1) less than the total mass flow rate of air into the cooled region 96 in the non-modulated operating mode (0.873 lbs/sec); and (2) greater than the previous mass flow rate in the first supply feed (listed above).

The fact that the cooling system of the present disclosure can operate in a modulated operating mode to reduce the amount of cooling air flowing into the cooled region is beneficial compared to a cooling system that only operates in the non-modulated operating mode. Turbine engines have a wide range of operating temperatures and therefore require more cooling during certain time periods (such as during takeoff) and less during others (such as during cruise flight). Enabling the amount of cooling air flowing into the cooled region to be reduced when less cooling is needed increases the efficiency of the engine by enabling air that would otherwise be diverted from the compressor stage for unnecessary cooling to produce work by instead flowing through the combustor and turbine stages.

Additionally, the fact that the cooling system of the present disclosure includes the flow limiters, particularly in the first supply feed, is beneficial as compared to an identical cooling system without the flow limiters. The diameters of the cooling air tubes of the first supply feed are large enough such that without the first flow limiter of the first supply feed, a significant pressure drop does not exist across the first supply feed to achieve the desired reduction in total mass flow rate of air into the cooled region. The use of the first flow limiter ensures the desired total mass flow rate of cooling air flowing into the cooled region can be achieved via the choked mass flow rate condition being satisfied.

Figure 3:
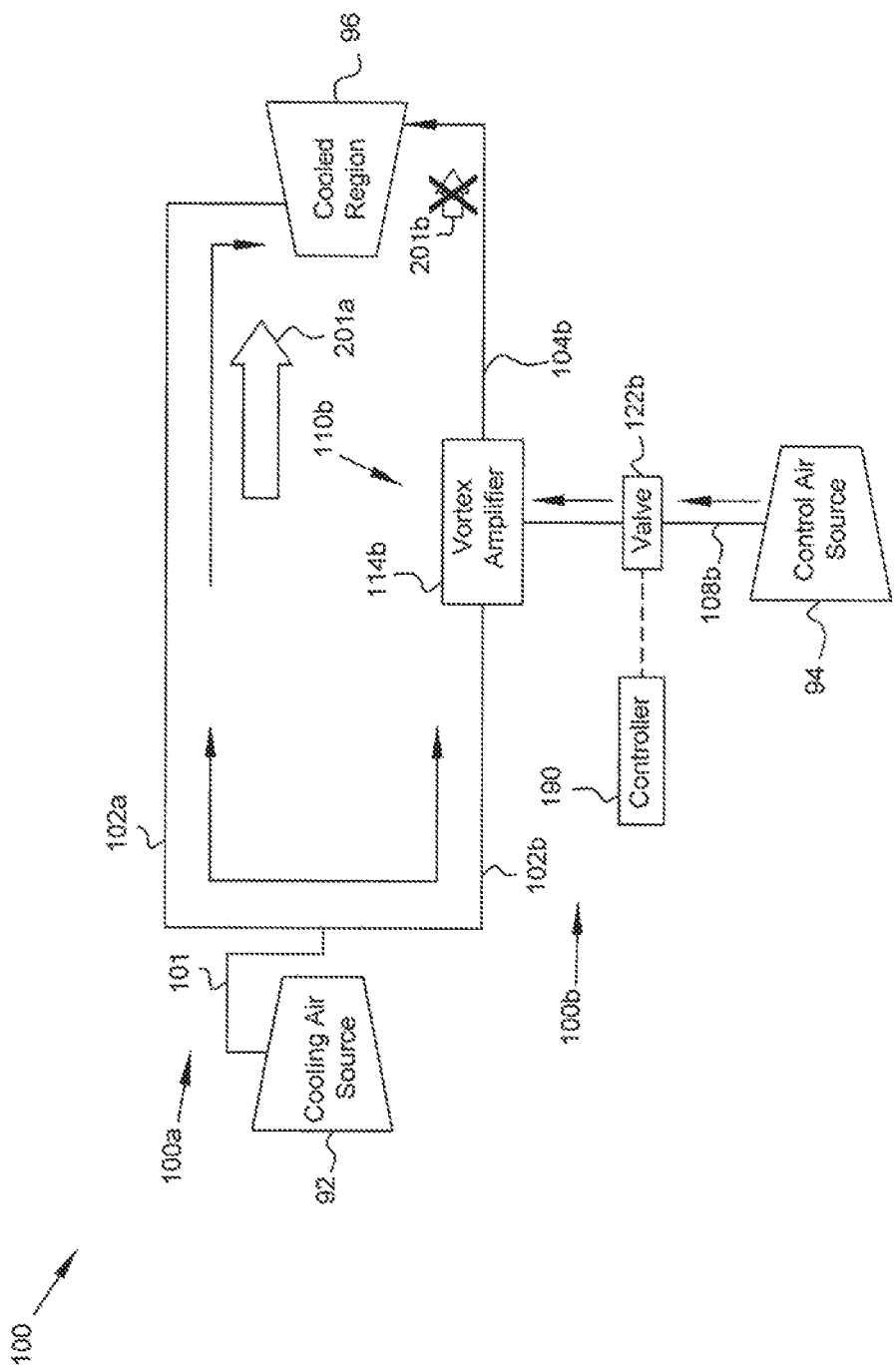
FIG. 3 is a block diagram of a prior art cooling system operating with modulation on a portion of the cooling system.

As shown in FIG. 4, when the second supply feed is not modulated, the flow to the cooled region through the first and second supply feeds are at a design state and represented as arrows 300a and 300b. However, as shown in FIG. 5, when the second supply feed is modulated to minimize flow 301b by opening the valve 112b and restricting cooling air from passing through the vortex amplifier, the flow of cooling air in the non-modulated first supply feed increases as represented by arrow 301a in FIG. 5. This increase in flow through the first supply feed 102a diminishes some of the performance gained through modulation of the second supply feed 102b, however to a lesser extent than experienced in the prior art as represented in FIG. 3 and Table 1. Table 2 below illustrates the effects on the first and second supply feeds when the second supply feed is modulated.

TABLE 2

|  | Second Supply Feed NOT MODULATED Operating Mode Cooling Air Mass Flow Rate (lbs/sec) | Second Supply Feed MODULATED Operating Mode Cooling Air Mass Flow Rate (lbs/sec) |
| --- | --- | --- |
| First supply feed (102a) | 0.489 | 0.627 |
| Second supply feed (102b) | 0.384 | 0.021 |
| Combined Feed (102a + 102b) | 0.873 | 0.648 |

As shown above, while there is an increase in mass flow through the first supply feed as a result of modulation in the first supply feed, the increase is significantly reduced from the prior air example of Table 1. In this example a 95% reduction in mass flow through the second supply feed results in a 25% reduction in the total mass flow. This is a significant increase over the 10% reduction in the prior art.

The controller 190 is configured to switch from the non-modulated operating mode to the modulated operating mode responsive to a cooling air modulation condition being satisfied. In one embodiment, a thermocouple communicates the temperature in the high-pressure turbine stage cavity to the controller 190, and the controller 190 is configured to switch from the non-modulated operating mode to the modulated operating mode responsive to the measured temperature in the high-pressure turbine stage cavity reaching a lower threshold temperature. In another embodiment, the cooling air modulation condition is satisfied responsive to an operator input requesting a switch to the modulated operating mode. Any other suitable cooling air modulation conditions may be employed.

Conversely, the controller 190 is configured to switch from the modulated operating mode to the non-modulated operating mode responsive to a cooling air non-modulation condition being satisfied. In one embodiment, a thermocouple communicates the temperature in the high-pressure turbine stage cavity to the controller 190, and the controller 190 is configured to switch from the modulated operating mode to the non-modulated operating mode responsive to the measured temperature in the high-pressure turbine stage cavity reaching an upper threshold temperature. In another embodiment, the cooling air non-modulation condition is satisfied responsive to an operator input requesting a switch to the non-modulated operating mode. Any other suitable cooling air modulation conditions may be employed. U.S. Pat. No. 7,712,317 which is hereby incorporated by reference describes fluidic devices for modulating cooling air flow applicable for use as a flow control device with the current subject matter.

While the cooling system 100 described above and shown in FIGS. 4 and 5 includes one first supply feed and one second supply feed, other embodiments of the cooling system 100 include any suitable quantity of first and second supply feeds. For example, another embodiment of the cooling system includes three first supply feeds and three second supply feeds. In other embodiments, a ratio of the quantity of first supply feeds to the quantity of second supply feeds is 1:1. Additionally, it is envisioned that in some embodiments each cooling air supply feed may be equipped with both a flow modulator (flow control device) and flow limiter, such that each supply feed is flow limited when not modulated.

An aspect of the disclosed subject matter also includes the use of a variable valve or orifice plate as the flow limiter. Moreover, it is also envisioned a vortex amplifier may also be used as the flow limiter in some embodiments.

Various modifications to the embodiments described herein will be apparent to those skilled in the art. These modifications can be made without departing from the spirit and scope of the present disclosure and without diminishing the intended advantages of the disclosed subject matter. It is intended that such changes and modifications be covered by the appended claims.

What we claim is:

1. A turbine engine cooling system comprising:
a first supply feed including a first flow limiter, the first supply feed fluidly connected to a cooling air source and a turbine section cavity to define a first cooling air path therebetween,
a second supply feed including a flow control device, the second supply feed fluidly connected to the cooling air source and the turbine section cavity to define a restrictable second cooling air path therebetween; the first and second supply feeds being in fluidic communication upstream of the flow control device; and
a controller operably connected to the flow control device to control the flow control device to restrict cooling air flow through the second cooling air path;
wherein the first flow limiter is configured to enforce an upper limit on a mass flow rate of cooling air exiting the first flow limiter when the second cooling air path is restricted by the flow control device.

2. The turbine engine cooling system of claim 1, wherein the second supply feed includes a second flow limiter downstream of the flow control device.

3. The turbine engine cooling system of claim 2, wherein the first and second flow limiters each include a Venturi nozzle having a converging section and a diverging section separated by a throat.

4. The turbine engine cooling system of claim 1, wherein the first flow limiter includes a Venturi nozzle having a converging section and a diverging section separated by a throat.

5. The turbine engine cooling system of claim 1, wherein the flow control device comprises:
a vortex amplifier fluidly connectable to a control air source; and a valve in fluid communication with the vortex amplifier and fluidly connectable with the control air source upstream of the vortex amplifier.

6. The turbine engine cooling system of claim 5, wherein the controller is operably connected to the valve to, when in fluid communication with the control air source, control the valve to enable control air from the control air source to flow to the vortex amplifier to restrict cooling air flow through the second cooling air path.

7. The turbine engine cooling system of claim 1, further comprising multiple first supply feeds and multiple second supply feeds, wherein a ratio of a quantity of first supply feeds to a ratio of a quantity of second supply feeds is 1:1.

8. A turbine engine comprising:
a cooling air source;
a turbine section defining a turbine section cavity; and
a cooling system comprising:
a first supply feed including a first flow limiter, the first supply feed defining a first cooling air path between the cooling air source and the turbine section cavity;
a second supply feed including a flow control device, the second supply feed defining a second restrictable cooling air path between the cooling air source and the turbine section cavity; and
a controller configured to, responsive to a cooling air modulation condition being satisfied, control the flow control device to restrict the cooling air from flowing from the cooling air source through the second supply feed to the turbine section cavity, thereby increasing the amount of cooling air flowing from the cooling air source to the first cooling air path; and,
wherein the first flow limiter is configured to cause a choked mass flow rate condition to be met in response to the increased amount of cooling air.

9. The turbine engine of claim 8, wherein the second supply feed includes a second flow limiter downstream of the flow control device.

10. The turbine engine of claim 9, wherein the first and second flow limiters each include a Venturi nozzle having a converging section and a diverging section separated by a throat.

11. The turbine engine of claim 8, wherein the first flow limiter includes a Venturi nozzle having a converging section and a diverging section separated by a throat.

12. The turbine engine of claim 8, further comprising a control air source, wherein the flow control device comprises:
a vortex amplifier in fluid communication with the control air source; and
a valve in fluid communication with the control air source and in a control air flow path between the vortex amplifier and the control air source.

13. The turbine engine of claim 12, wherein the controller is further configured to, responsive to the cooling air modulation condition being satisfied when the cooling air is flowing from the cooling air source through the first cooling air path to the turbine section cavity and from the cooling air source through the second cooling air path to the turbine section cavity, control the valve to enable control air from the control air source to flow to the vortex amplifier to restrict the cooling air from flowing from the cooling air source through the second supply feed and to the turbine section cavity.

14. The turbine engine of claim 8, further comprising multiple first supply feeds and multiple second supply feeds, wherein a ratio of a quantity of first supply feeds to a ratio of a quantity of second supply feeds is 1:1.

15. The turbine engine of claim 8, further comprising a compressor section, wherein the cooling air source comprises a compressor section air outlet.

16. A method of cooling a turbine section cavity of a turbine engine, the method comprising:
flowing cooling air from a cooling air source through a first cooling air path defined by a first supply feed including a first flow limiter to the turbine section cavity;
flowing cooling air from the cooling air source through a second cooling air path defined by a second supply feed including a flow control device to the turbine section cavity; and
responsive to a cooling air modulation condition being satisfied, restricting the cooling air from flowing from the cooling air source through the second cooling air path to the turbine section cavity, thereby increasing the amount of cooling air flowing from the cooling air source into the first cooling air path and causing a choked mass flow rate condition to be met at the first flow limiter to limit the mass flow rate of the cooling air exiting the first flow limiter.

17. The method of claim 16, further comprising:
flowing the cooling air from the cooling air source through the first cooling air path at a first mass flow rate;
flowing the cooling air from the cooling air source through the second cooling air path at a second mass flow rate; and
responsive to the cooling air modulation condition being satisfied, restricting the cooling air from flowing from the cooling air source through the second supply feed to the turbine section cavity, thereby increasing the amount of cooling air flowing from the cooling air source into the first cooling air path and causing the choked mass flow rate condition to be met at the first flow limiter to limit the mass flow rate of the cooling air exiting the first flow limiter to a third mass flow rate.

18. The method of claim 17, wherein the third mass flow rate is greater than each of the first and second mass flow rates and less than a sum of the first and second mass flow rates.

19. The method of claim 16, wherein the first flow limiter includes a Venturi nozzle having a converging section and a diverging section separated by a throat.

20. The method of claim 16, further comprising restricting the cooling air from flowing from the cooling air source through the second cooling air path to the turbine section cavity by enabling control air to flow from a control air source to a vortex amplifier in the second cooling air path.

* * * * *